(12) United States Patent
Suda

(10) Patent No.: US 12,294,170 B2
(45) Date of Patent: May 6, 2025

(54) SYSTEM FOR CHARGING ELECTRICAL MICROMOBILITY VEHICLES

(71) Applicant: Micromobility Solutions Sp. z o.o., Cracow (PL)

(72) Inventor: Kamil Suda, Cracow (PL)

(73) Assignee: MICROMOBILITY SOLUTIONS SP. Z O.O., Cracow (PL)

( * ) Notice: Subject to any disclaimer, the term of this patent is extended or adjusted under 35 U.S.C. 154(b) by 349 days.

(21) Appl. No.: 17/874,351

(22) Filed: Jul. 27, 2022

(65) Prior Publication Data
US 2023/0029793 A1 Feb. 2, 2023

(30) Foreign Application Priority Data

Jul. 27, 2021 (PL) .......................................... 438607
Feb. 21, 2022 (EP) .................................... 22157794

(51) Int. Cl.
| | |
|---|---|
| *H01R 13/04* | (2006.01) |
| *B60L 53/16* | (2019.01) |
| *B60L 53/31* | (2019.01) |
| *H01R 13/10* | (2006.01) |
| *H01R 13/453* | (2006.01) |
| *H01R 13/52* | (2006.01) |
| *H01R 13/639* | (2006.01) |
| *H01R 13/66* | (2006.01) |

(52) U.S. Cl.
CPC .............. *H01R 13/10* (2013.01); *B60L 53/16* (2019.02); *B60L 53/31* (2019.02); *H01R 13/04* (2013.01); *H01R 13/4534* (2013.01); *H01R 13/5213* (2013.01); *H01R 13/639* (2013.01); *H01R 13/6683* (2013.01); *B60L 2200/12* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 5,523,666 | A * | 6/1996 | Hoelzl ................... | B60L 53/35 320/109 |
| 10,445,962 | B2 * | 10/2019 | Neupert .................. | B60L 53/31 |
| 2020/0231053 | A1 | 7/2020 | Saint-Germain et al. | |

(Continued)

FOREIGN PATENT DOCUMENTS

| | | | | |
|---|---|---|---|---|
| CN | 107959177 A | * | 4/2018 | ............. B60L 53/16 |
| DE | 102019205548 A1 | * | 6/2020 | |

(Continued)

*Primary Examiner* — Tho D Ta
(74) *Attorney, Agent, or Firm* — Rivka Friedman

(57) ABSTRACT

A system for charging electrical micromobility vehicles includes a post (20); a socket (30) located in the post (20); and a plug (40) to be mounted on the vehicle. The socket (30) has a longitudinal opening (34) arranged vertically on the post (20). The height (H) of the opening (34) of the socket (30) is larger than the height (h) of the plug (40). The socket (30) has a socket first and second contact means (31, 32). The plug (40) has a plug first and second contact means (41, 42) arranged so that when the plug (40) is inserted into the socket (30) at any position along the height (H) of the opening (34), the socket first and second contact means (31, 32) form an electrical connection with the corresponding plug first and second contact means (41, 42).

12 Claims, 14 Drawing Sheets

(56) References Cited

U.S. PATENT DOCUMENTS

2020/0238840 A1* 7/2020 Heestermans .......... B60L 53/36
2021/0138919 A1* 5/2021 Weber ................ H01R 13/6205

FOREIGN PATENT DOCUMENTS

| DE | 102019216061 A1 | * | 4/2021 | |
|---|---|---|---|---|
| DE | 102021002039 A1 | * | 6/2021 | |
| FR | 2997571 A1 | * | 5/2014 | .......... B60L 11/1818 |
| WO | WO-2021016297 A1 | * | 1/2021 | .............. B60L 53/14 |
| WO | WO-2021074044 A1 | * | 4/2021 | ............... B62H 3/02 |

* cited by examiner

SYSTEM FOR CHARGING ELECTRICAL MICROMOBILITY VEHICLES

TECHNICAL FIELD

The present invention relates to a system for charging electrical micromobility vehicles.

BACKGROUND

There are known charging systems that comprise a charging station to which an electric vehicle may be connected to charge the battery of the vehicle.

The charging stations known so far are not designed to be compatible with different types of vehicles, that may have a charging connector located at different heights. Namely, the charging stations are typically designed to charge a vehicle having a dedicated connector that must be located in a vehicle at a particular height in order to be fit into the charging station socket. Alternatively, cable connectors can be used, which is troublesome for the user.

SUMMARY OF THE INVENTION

There is a need to provide a charging system that would be devoid of the disadvantages known so far. In particular, there is a need for a charging station that could handle a plurality of different vehicles, having connectors located at various positions.

The invention pertains to charging motor vehicles having an electric drive, regardless of whether it is a purely electric drive or a hybrid drive, when there is a need to charge the battery of the vehicle drive It should be understood that the term "micromobility vehicles" refers to a range of small, lightweight vehicles which are driven by users personally. Thus micromobility devices (vehicles) include bicycles, e-bikes, electric scooters, electric skateboards, shared bicycles, electric pedal assisted (pedelec) bicycles and also vehicles such as golf carts, handcycles, hobcarts, hoverboards, kick scooters, microcars such as neighbourhood electric vehicles, mobility scooters, onewheels (board), quadracycles, personal transporters or ridable (also referred to as 'personal light electric vehicle'), roller skates, segways, skateboards, strollers, tricycles, electric unicycles, velomobiles, electric wheelchairs.

The system is intended for use in public places such as car parks, the vicinities of bus/tram/metro stops, as well as in underground garages, the vicinities of hotels, or other places.

An advantage of the invention is its versatility for various types of vehicles with charging connectors placed at different heights, which can be charged using a single station/post. The invention allows safe charging of vehicles with various wheel sizes and front fork heights.

The invention relates to a system for charging electrical micromobility vehicles comprising a post; a socket located in the post; and a plug to be mounted on the vehicle. The socket has a longitudinal opening arranged vertically on the post. The height H of the opening of the socket is larger than the height h of the plug. The socket comprises a socket first contact means for providing contact along a first vertical line and a socket second contact means for providing contact along a second vertical line distanced from the first vertical line; and the plug comprises a plug first contact means and a plug second contact means arranged correspondingly to the socket first and second contact means so that when the plug is inserted into the socket at any position along the height H of the opening, the socket first and second contact means form an electrical connection with the corresponding plug first and second contact means.

By providing the longitudinal opening with the socket contact means, arranged along separate lines, wherein the height H of the opening is larger than the height h of the plug it is possible to insert the plug at any position along the height H of the opening into the socket. Therefore in different types of vehicles, for example scooters, bicycles, motors the plug may be mounted to the vehicle fork 2 at any distance from the ground which is within the length (height H) of the opening of the socket. For example in case of a scooter the plug may be mounted closer to the ground than it is in case of the bicycle (it results from the fact that the wheels of the scooter are significantly smaller than the wheels of the bicycles, therefore the dimensions of the vehicle fork are also different).

In case of a single-track vehicles, when such a vehicle is plugged into the post, it is maintained in a standing position without the need of using any additional holders or supports. In other words the plug functions both as a charging plug and as docking element for holding the vehicle.

The ratio of the height (H) of the opening of the socket to the height (h) of the plug is preferably equal from 1.5 to 10. The bigger the ratio between the height H to the height h is, the more flexibility in selecting the plug mounting level (distance from the ground) is provided.

The socket may comprise retractable elements for covering the opening of the socket. The retractable elements protect the interior of the post against atmospheric conditions or against penetration of foreign objects through the opening.

The retractable elements may have a form of blocks slidable in a horizontal direction wherein during insertion of the plug the blocks may be pushed by the plug towards the inside of the socket. As a result, the section of the socket which is not at the level of the plug is still protected (remains closed).

The post may comprise a presence sensor for detecting the position of the retractable elements. The signal of the presence sensor may be used to control operation of other elements of the post, such as activate the charging process upon detection that the plug has been inserted to the socket.

The socket may comprise a socket third contact means for providing contact along a third vertical line and the plug may comprise plug third contact means corresponding to the socket third contact means. The third contact means may be used for communication between the socket and the plug.

The system may further comprise a locking bar for securing the plug inside the socket, wherein the plug comprises a plug notch for receiving the locking bar and the retractable elements comprise a blocking notch for receiving the locking bar. This prevents insertion of foreign objects, fingers etc. into the socket while charging, providing protection against electrical shock and short circuits.

The plug can be mountable aside a vehicle fork, for example on the left or on the right side of the vehicle fork.

The post can be mounted on a base that is secured to the ground, therefore the post can be easily replaced when damaged.

The base may comprise a wheel positioning mechanism for positioning the wheel of the vehicle and the vehicle during plugging in of the plug into the socket. This facilitates insertion of the plug into the socket.

These and other features, aspects and advantages of the invention will become better understood with reference to the following drawings, descriptions and claims.

BRIEF DESCRIPTION OF DRAWINGS

The present invention is shown by means of preferable embodiments in a drawing, wherein.

DETAILED DESCRIPTION

Figure 1:
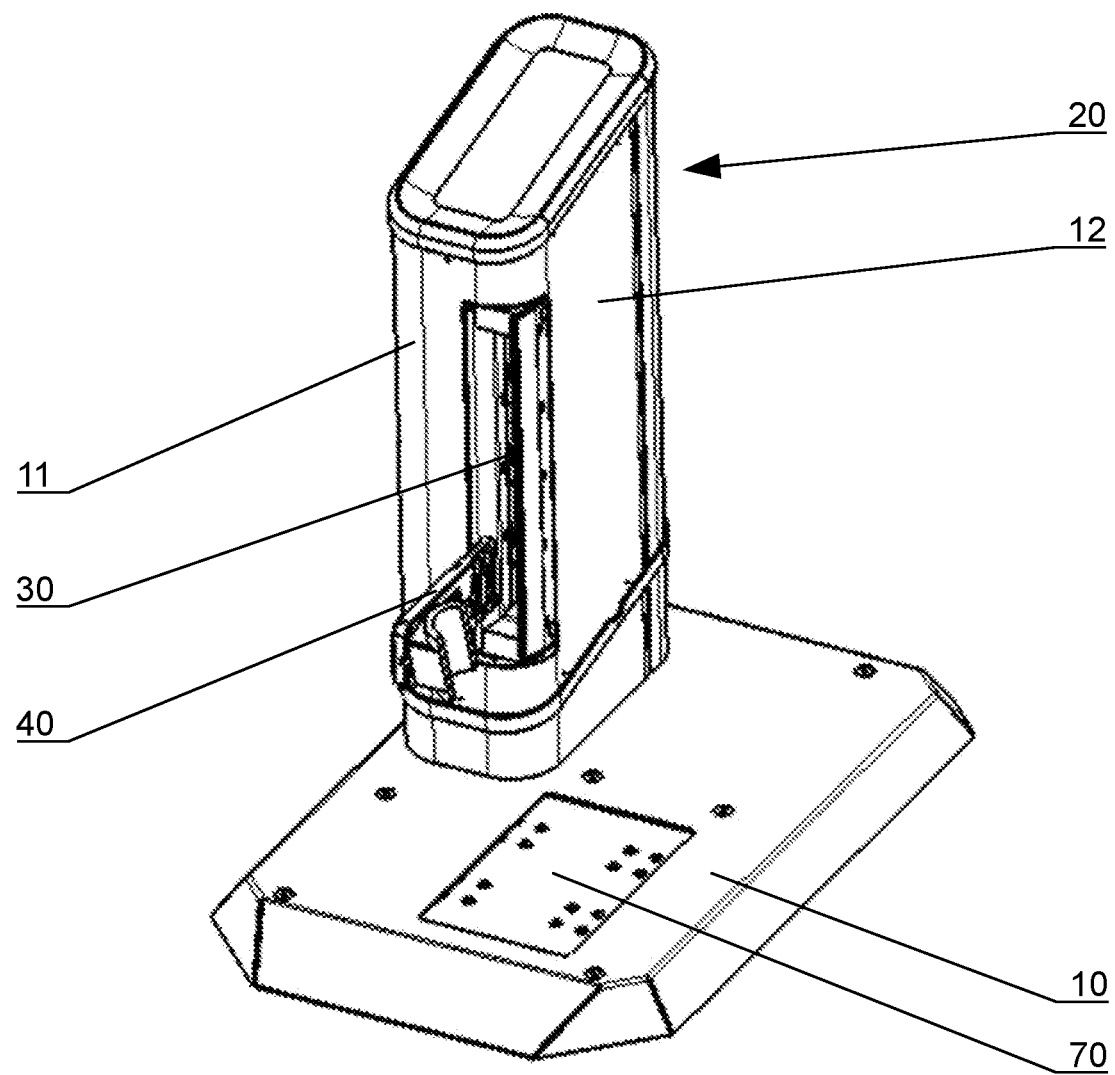
FIG. 1 presents a charging system according to the invention in an isometric view.
Figure 2A:
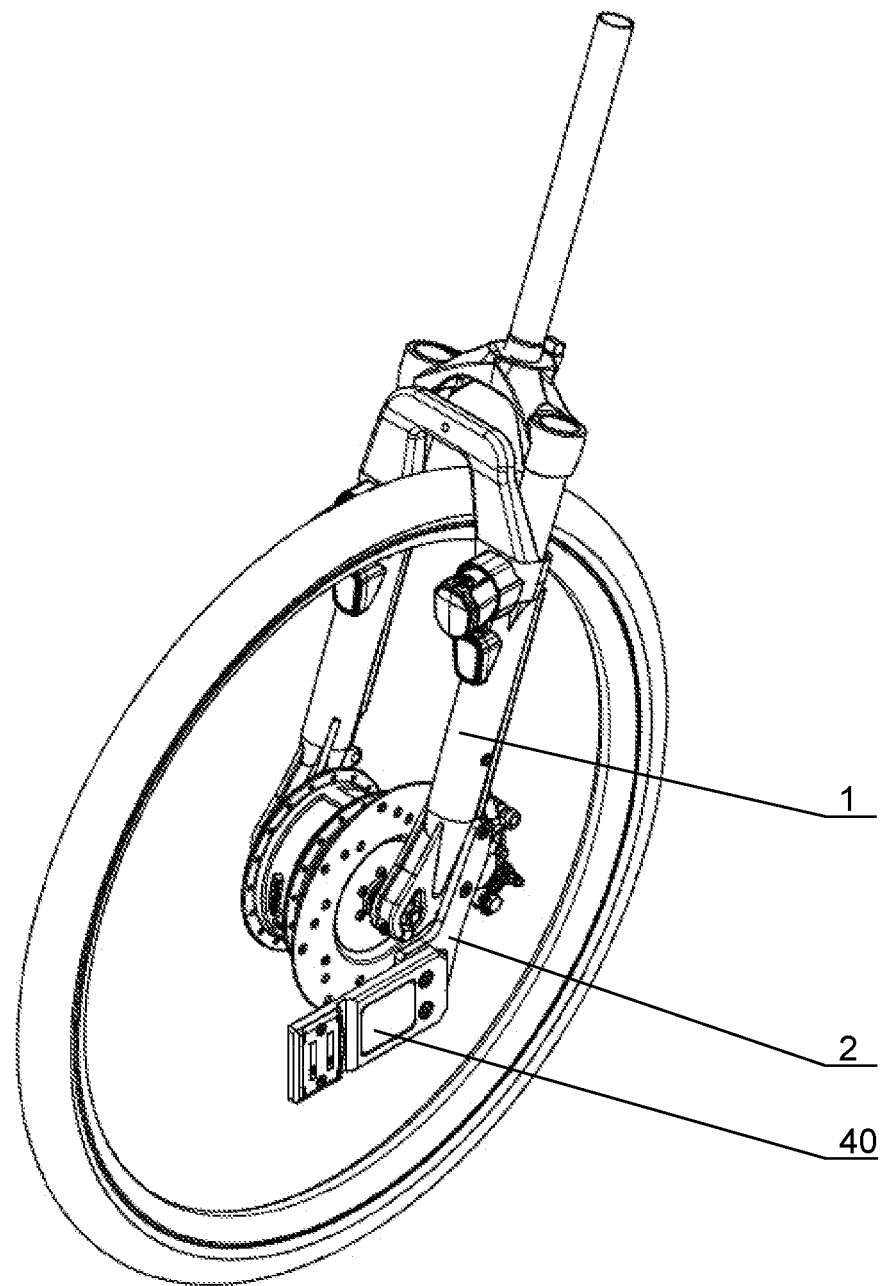
FIG. 2A presents a vehicle wheel with a plug in an isometric view.
Figure 2B:
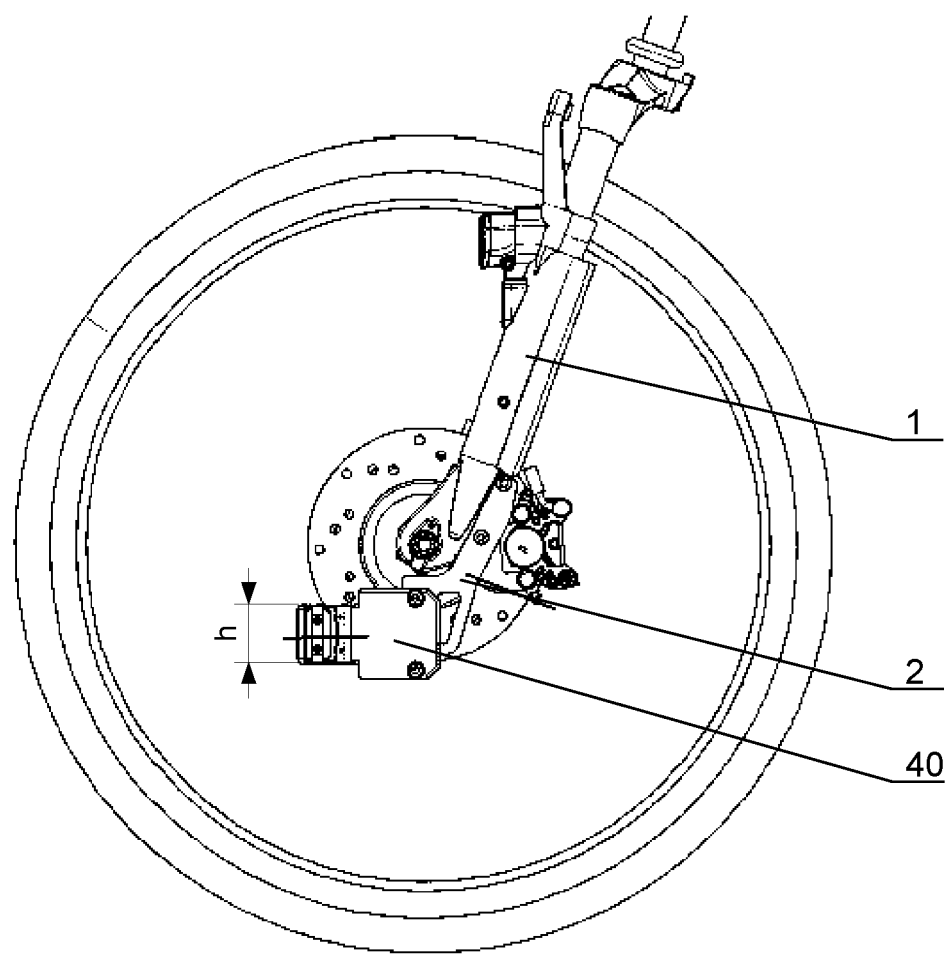
FIG. 2B presents a vehicle wheel with a plug in a side view.

The description presented herein is not to be taken in a limiting sense, but is made merely for the purpose of illustrating the general principles of the invention.

The following detailed description relates to an embodiment configured for charging electric bicycles, but it can be equivalently applied to other types of micromobility vehicles.

The embodiment presented herein contains all features foreseen by the present disclosure. However, other embodiments are feasible as well that do not contain all features necessary to achieve particular technical advantages corelated with such feature.

The system comprises a post 20 with a socket 30. The socket 30 is designed for accommodating therein a plug 40 to be mounted on the vehicle.

The base 10 may have a front housing 11 and a back housing 12. The front housing 11 can be made of stainless steel.

The internal components of the post 20 can be fixed to a section 27 made of bent stainless steel. It acts as the main frame for all the other internal components. The electronics casing 28 is mounted on two flat bars screwed to the section 27. The electronics casing 28 is made of steel and is shaped so as to allow heat to dissipate outside, thanks to which heating of the charging station 1 is limited. Inside it, there is the main printed circuit board (PCB).

The socket 30 has a longitudinal opening 34 arranged vertically on the post 20. The height H of the opening 34 is larger than the height h of the plug 40, for example the ratio of H:h can be from 1.5 to 10. For example the height H of the opening 34 can be equal from 130 mm to 500 mm, preferably from 250 mm to 350 mm, preferably 296 mm, wherein the height h of the plug 40 can be equal from 50 mm to 90 mm, preferably from 60 mm to 80 mm. The bottom end of the opening 34 can be located at a distance equal from 100 mm to 500 mm above the ground, preferably from 200 mm to 496 mm.

The socket 30 has a socket first contact means 31 for providing contact along a first vertical line and a socket second contact means 32 for providing contact along a second vertical line distanced from the first vertical line. The plug 40 has a plug first contact means 41 and a plug second contact means 42 arranged correspondingly to the socket first and second contact means 31, 32 so that when the plug 40 is inserted into the socket 30 at any position along the height H of the opening 34, the socket first and second contact means 31, 32 form an electrical connection with the corresponding plug first and second contact means 41, 42. The contact means 31, 32 may be made of copper and the contact means 41, 42 may be made of brass.

The socket first contact means 31 and the socket second contact means 32 may have a form of longitudinal electric bars or may have a form of a plurality of single point contacts (such as pins) arranged vertically, wherein the socket first contact means 31 may be positive contacts for providing positive charge and the socket second contact means 32 may be negative contacts for providing negative charge, wherein the positive contacts are grouped in the line separately from the negative contacts. In other words the plurality of single point socket first contact means 31 are arranged along a first line and the plurality of single point socket second contact means 32 are arranged along a second line parallel but separate to the first line.

The plug 40 may be mounted to the vehicle for example on a vehicle front fork 1 by means of an adapter 2. The adapter 2 can be selected such as to mount the plug 40 to different types of vehicle forks 1 (or other parts of the vehicle structure), depending on the fork thickness, length etc. The plug 40 may also be mounted to other elements of a vehicle (such as a fender, a bumper, generally to a body of a vehicle) in such a manner that it is possible for the vehicle to approach to the post 20 and connect the plug 40 to the socket 30. The adapter 2 can be mounted by means of two metal mounting connectors 46 (only one shown in the drawing) that are to be wrapped around and clamped on the fork 1 of the vehicle. The plug 40 can be made of stainless steel. It may have two plastic inserts 45 in which the plug contact means 41, 42, 43 are mounted. The inserts 45 may also be made of another non-conductive material, for example, an elastomer.

The plug 40 may have a form of a substantially flat plate wherein the plug contact means 41, 42 are arranged at one end of the plug 40, opposite to the end at which the adapter 1 is attached, correspondingly to the arrangement of the socket contact means 31, 32. Thus when the plug 40 is inside the socket 30 the socket first contact means 31 are in contact with the plug first contact means 41 (being for example positive charge contacts) and the socket second contact means 32 are in contact with the plug second contact means 42 (being for example negative charge contacts). The thickness of the plug 40 may be equal from 10 mm to 30 mm.

The socket contact means 31, 32 may be arranged on one side of the socket 30 or may be arranged on opposite sides of the socket 30. Similarly the plug contact means 41, 42 may be arranged on one side of the plug 40 or may be arranged on opposite sides of the plug 40.

The socket 30 may comprise retractable elements 60 for covering the opening 34 of the socket 30 to protect it from the outside environment. The retractable elements 60 may have a form of blocks slidable in a horizontal direction wherein during insertion of the plug 40 the blocks 60 are pushed by the plug 40 towards the inside of the socket 30. Each retractable element 60 may have a height substantially smaller than the height of the plug 40, for example the plug 40 may have a height of five retractable elements 60. During insertion of the plug 40 into the socket 30, the blocks 60 are pushed by the plug 40 at the region equal or greater than the height h of the plug 40, thereby allowing the plug 40 to be inserted into the socket 30, wherein the blocks which do not interact with the plug 40 remain still. The retractable elements 60 may be mounted slidably on horizontal guides 64, wherein the horizontal guides 64 are provided with a retracting spring 62 for maintaining the retractable elements 60 in their initial home) position when the plug 40 is outside the socket 30. In order to ensure the required safety features of the device, a gap of no more than 10 mm shall remain between the plug 40 and the next retractable element 60 that has not been pushed inside. This prevents an electric shock to the user once the charging process begins. The retractable elements 60 in the form of blocks ensure linear charging of vehicles with plugs 40 at different heights and also provide electric shock protection.

In other words, the operating principle of the retractable elements 60 in the form of blocks is based on the use of a mechanism of two guides as well as two sleeves 65 and rods, also called horizontal guides 64, onto which a spring 62 is located to ensure that the retractable element 60 in the form of block returns to its initial position after the plug 40 is removed from the post 20. The entire mechanism of the retractable elements 60 in the form of blocks is contained in a post 20 made of stainless steel, which consists of two parts. This is the main component of the mechanical interior of the post 20, responsible for carrying out the entire process of both locking and charging the vehicle.

In other embodiments the retractable elements 60 may have a form of swivel or pivotable flaps or other closing means suitable for securing the opening 34 of the socket 30.

The post 20 may further comprise a presence sensor 63 for detecting the position of the retractable elements 60. For example the presence sensor 63 may have a form of an optical sensor. The presence sensor 63 is configured to detect the retracted position of the at least on retractable element 60. The retracted position of the retractable elements 60 corresponds to the information concerning proper insertion of the plug 40 into the socket 30, as the plug 40 acts on the retractable elements 60 during insertion. For example when the plug 40 is fully inserted into the socket 30 the retractable element 60 crosses the light path of the optical sensor providing signal to a charging controller located in the post 20.

The socket 30 may have a socket third contact means 33 for providing contact along a third vertical line and the plug 40 may comprise plug third contact means 43 corresponding to the socket third contact means 33. The third contact means 33, 43 are signal contacts and provide communication between the post 30 and the vehicle. In particular they provide communication between a charging controller located in the post 30 and the battery controller located in the vehicle. Therefore it is possible for the charging controller to receive information concerning the type of the battery, state of the battery mounted in the vehicle in order to select appropriate charging parameters like voltage, current etc.

After inserting the plug 40 into the charging socket 30 and after recognising the appropriate type of charging parameters for the vehicle battery the charging process is initiated. After the battery is fully charged or when the user decides to stop the charging process the locking bar is moved to the unlocked position allowing the plug 40 to be removed from the socket 30.

The charging circuit may comprise a converter for providing suitable charging voltage and current. The converter may comprise an LLC resonant circuit, a controller, and two feedback loops: a current loop and a voltage loop. The converter may also have a circuit for switching the LLC converter controller on and off with a microcontroller. The current loop ensures that the battery charging current remains constant during constant current charging, whereas the voltage loop maintains a constant output voltage during constant voltage charging. The charging voltage and current are set by changing the reference voltage for the current and voltage loops. The reference voltages for the current and voltage loops are generated by a digital-to-analogue converter (DAC) that is built into the microcontroller.

The plug 40 may comprise an electronic circuit that stores information about the voltage and current intensity at which the battery in a particular vehicle should be charged. After the plug 40 has been inserted into the post 20 and the plug contact means 41, 42, 43 are in contact with the socket contact means 31, 32, 33 this information can be transmitted via one of the plug contact means 41, 42, 43, preferably via the third contact means 43, to the converter of the charging station, which then generates a current at a given voltage and intensity according to the requirements of the battery in the particular vehicle.

Furthermore, the post 20 may have two LED strips 14. The LED strips indicate that the post 20 is ready for use. The LEDs may light up in green or red, informing the user whether it is possible to connect the vehicle to the post 20. Red LEDs may light up, for example, if the post 20 is damaged or if another user has already reserved this charging station for their vehicle.

The system may also comprise a locking bar 50 for securing the plug 40 inside the socket 30, wherein the plug 40 comprises a plug notch 44 for receiving the locking bar 50 and the retractable elements 60 comprise a blocking notch 61 for receiving the locking bar 50.

The locking bar 50 is mounted slidably on guiding members 51 along a horizontal direction. Wherein the locking bar 50 is maintained in its locking position by means of a spring 52. The spring 52 may be located on one of the guiding members 51. When the plug 40 is being inserted into the socket 30 the locking bar 50 is retracted by means of the retractable elements 60 which are being pushed by the plug 40 (the blocking notch 61 comprises one inclined sidewall which pushes the retractable elements 60 aside). When the plug 40 is fully inserted the locking bar 50 jumps into the plug notch 44 and into the blocking notch 61 of the retractable elements 60 which remain in their home position (the retractable elements 60 which were not pushed by the plug 40.

The locking bar 50 may have a form of an aluminium bolt. The bolt may 50 move on two linear bearings 53, that travel along a guide, also called guiding members 51 and ensure smooth engagement and disengagement of the locking bar 50, as well as short springs, also called springs 52 responsible for pressing the locking bar against the retractable elements 60 in the form of blocks and the plug 40 in which a groove, also called a plug notch 44 and a blocking notch 61 is milled with a shape corresponding to that of the locking bar 50.

The system may comprise a blocking mechanism 80 for blocking the locking bar 50 in a position where the locking bar 50 is inserted into the plug notch 44 and for moving the locking bar 50 to an unlocked position in which the locking bar 50 is retracted from the plug notch 44. As a result the locking bar 50 is blocked in its locking position by the blocking mechanism 80 and the movement of the retractable elements 60, which remain in their home position, is blocked. Thus the socket 30 is secured on its entire length.

The locking bar 50 may acquire three different position states. The position states are determined by means of three position sensors 81, 82, 83, which may have a form of limit switches.

Figure 10A:
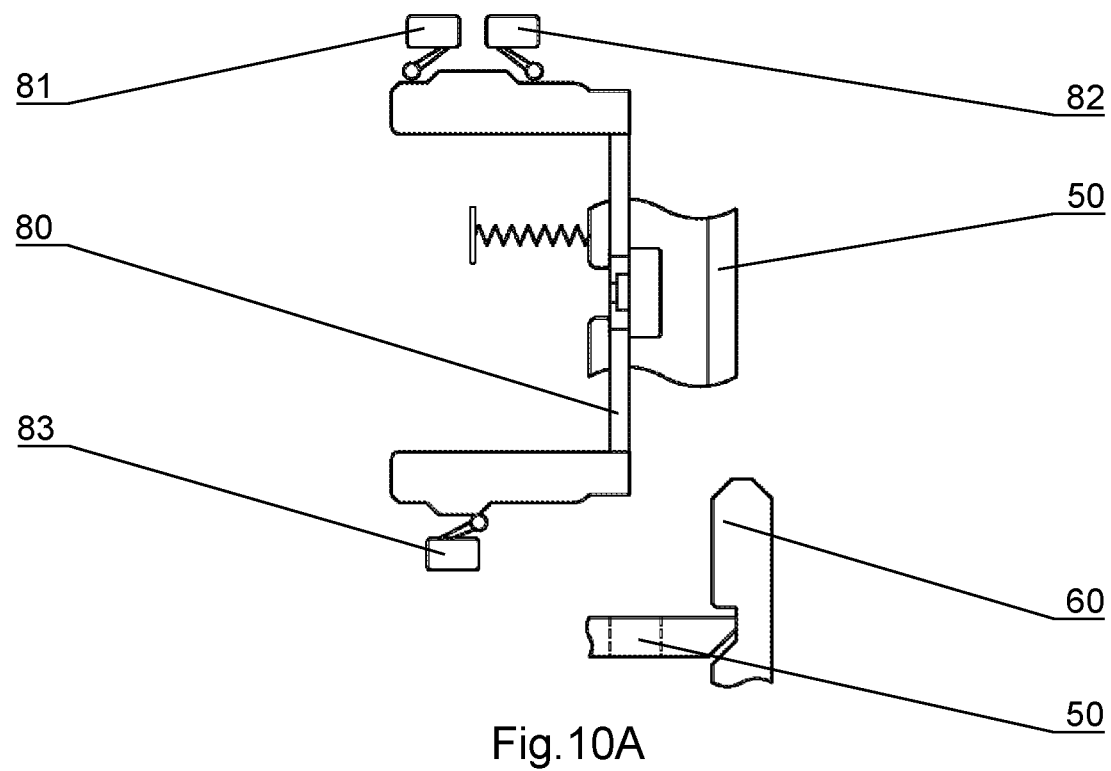
FIG. 10A-10C present different position states of a locking bar.
Figure 10B:
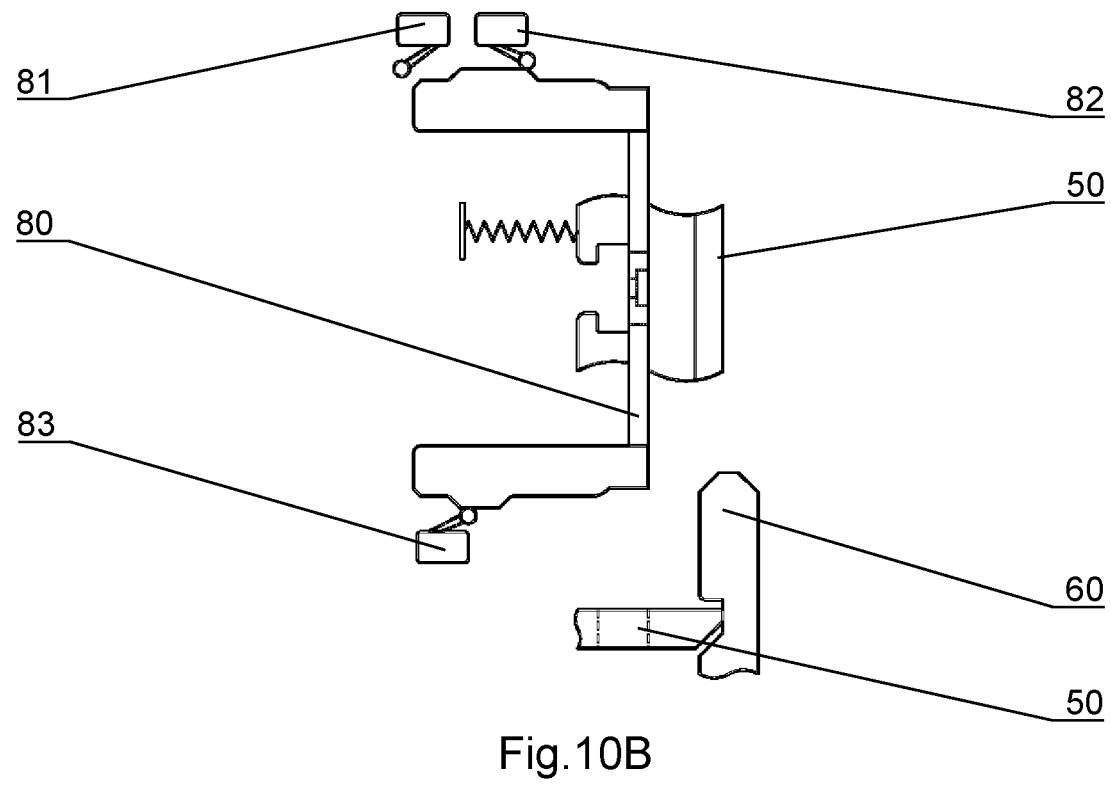
Figure 10C:
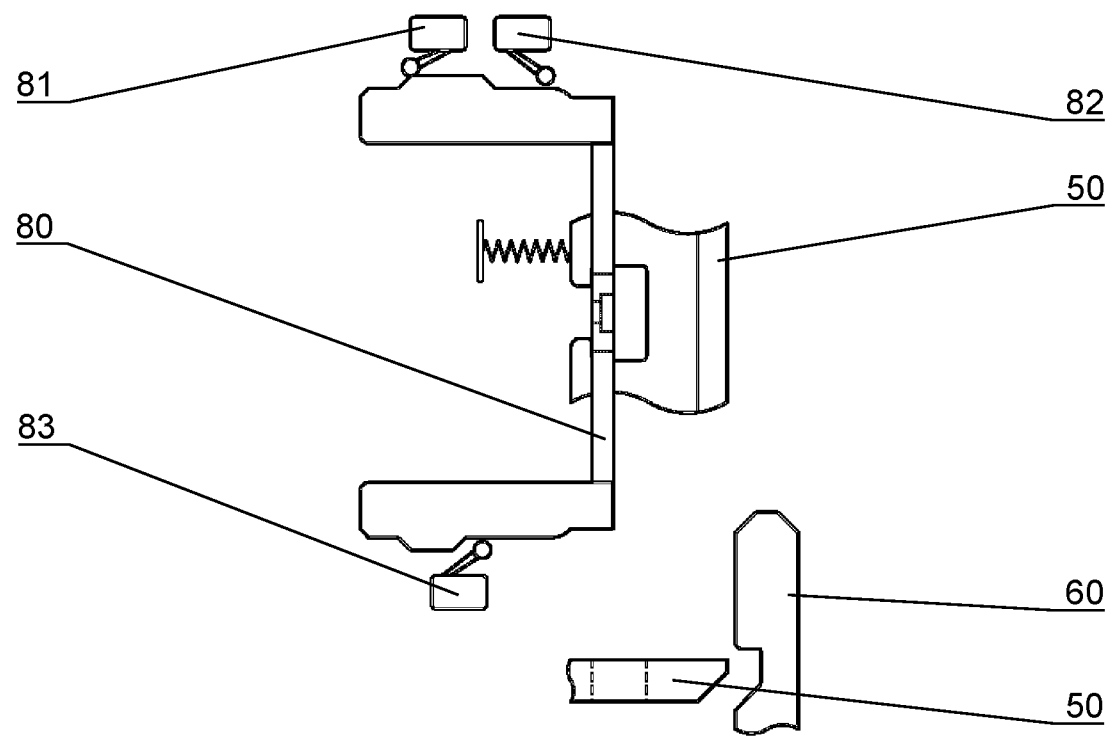
Figure 11:
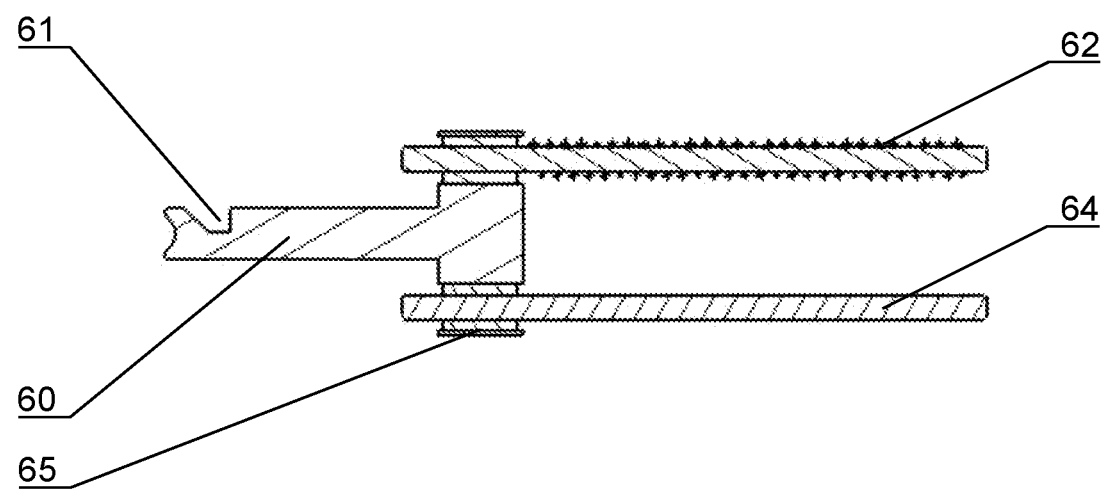
FIG. 11 presents details of a retractable element.

The first position state is a locking position in a blocked state (FIG. 10B) where the movement of the locking bar 50 is blocked by the blocking mechanism 80. In the first position state the first position switch 81 is in an open state while the second position switch 82 and the third position switch 83 are in a closed state (in the closed state the position sensor may output the control signal). In the first position state the movement of the retractable elements 60 and the plug 40 is blocked.

The second position state is a locking position in an unblocked state (FIG. 10A), where the locking bar 50 is in the locking position maintained only by the spring 52. In the second position state the opening 34 of the socket 30 is covered by the retracting elements 60, but the movement of the retracting elements 60 is not blocked, thereby while introducing the plug 40 into the socket 30 the locking bar 50 is pushed aside by the retracting elements 60 allowing the plug 40 to be inserted into the socket 40. In the second position state the first position switch 81 and the second position switch 82 are in an open state while the third position switch 82 is in a closed state.

The third position state is an unlocked position where the locking bar is retracted by the blocking mechanism 80 as presented in FIG. 10O. In the third position state it is possible to remove the plug 40 from the socket 30. In the third position state the second position switch 82 and the third position switch 83 are in the open state while the first position switch 81 is in the closed state.

However apart from the abovementioned configuration also other arrangements of position sensors and other types of position sensor are possible within the present invention.

The base 10 may comprise a wheel positioning mechanism 70 for positioning the wheel of the vehicle and the vehicle during plugging in of the plug 40 into the socket 30.

Figure 3:
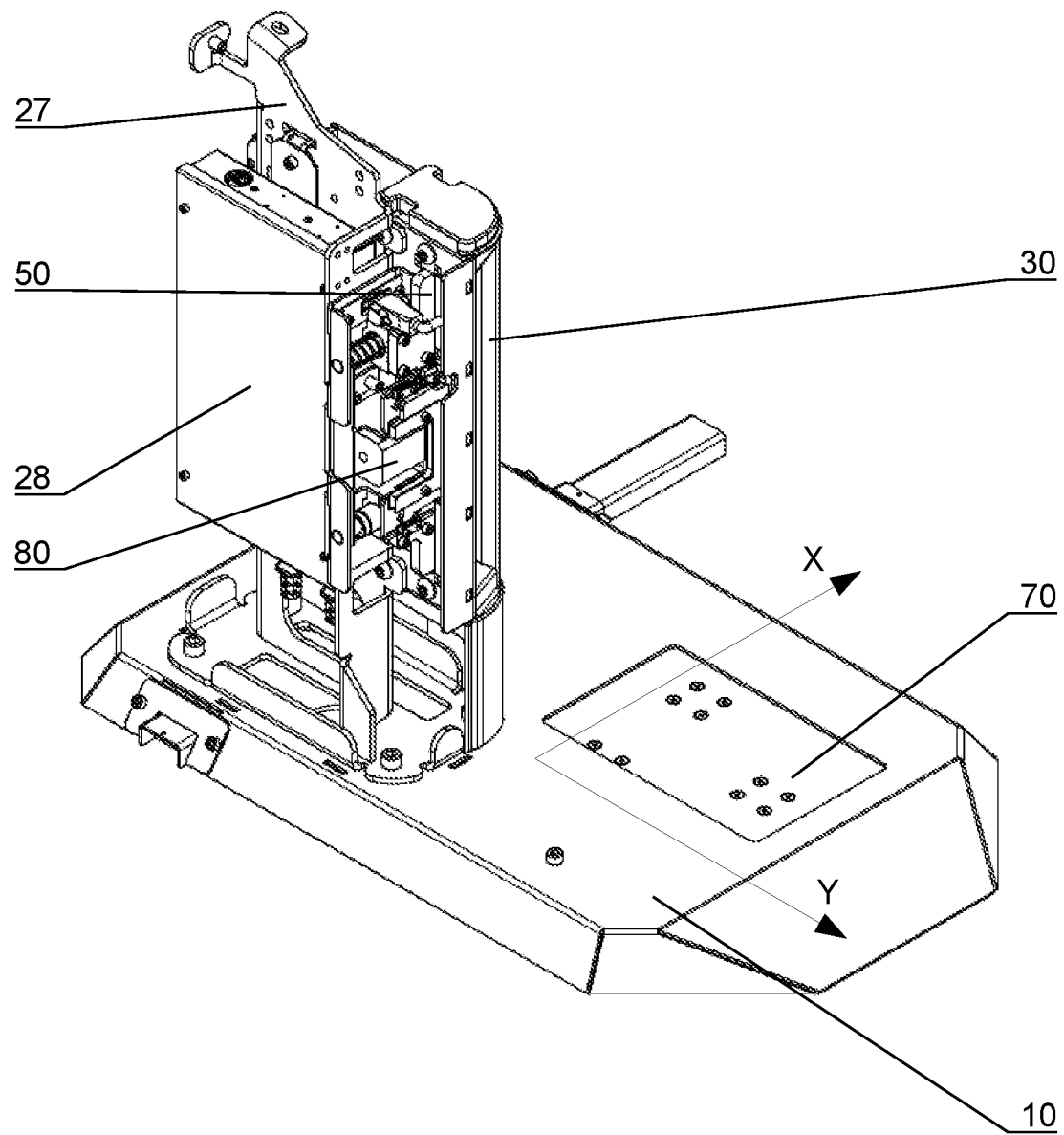
FIG. 3 presents the charging system without a housing in an isometric view.
Figure 4:
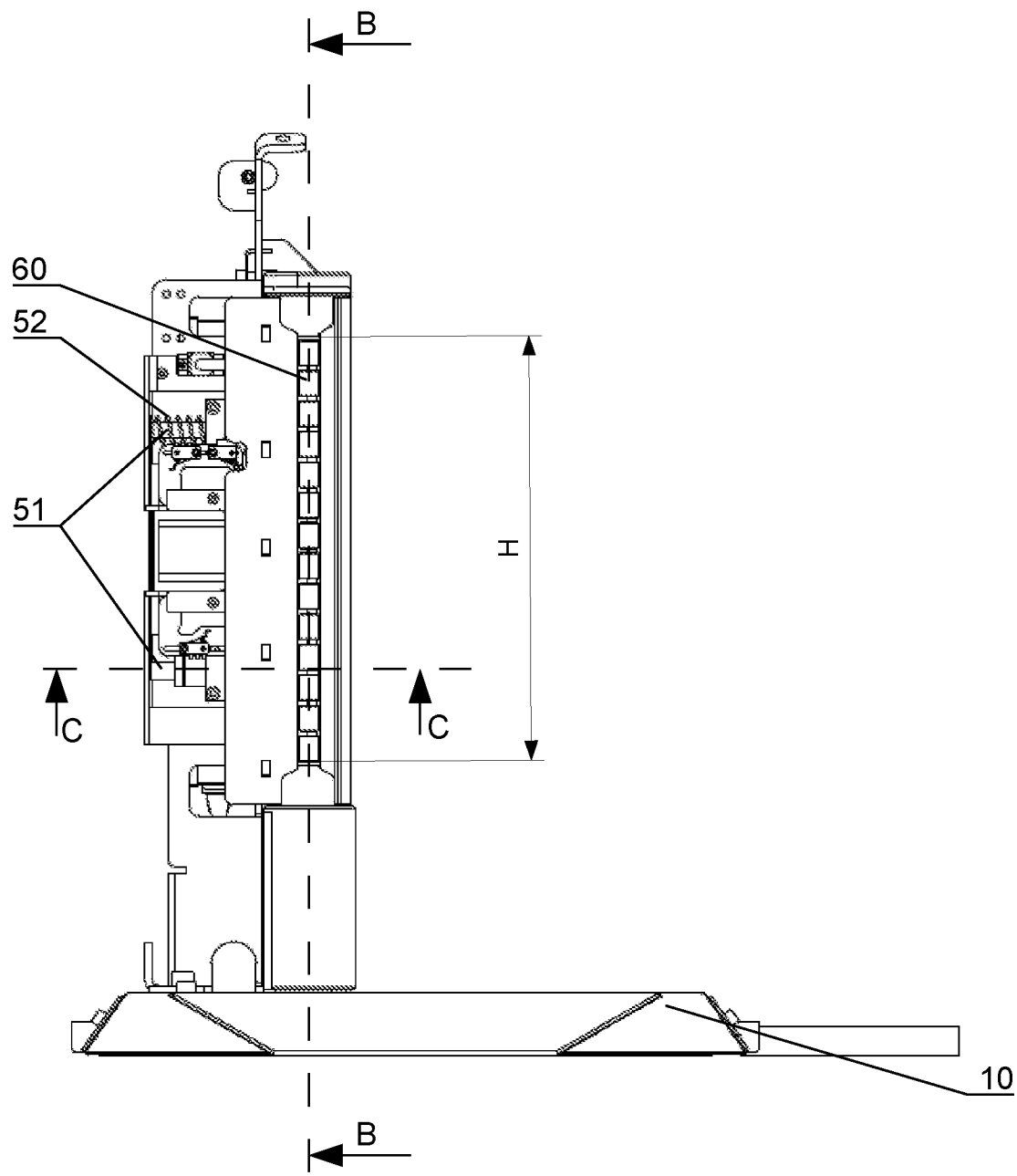
FIG. 4 presents the charging system without a housing in a front view.
Figure 5:
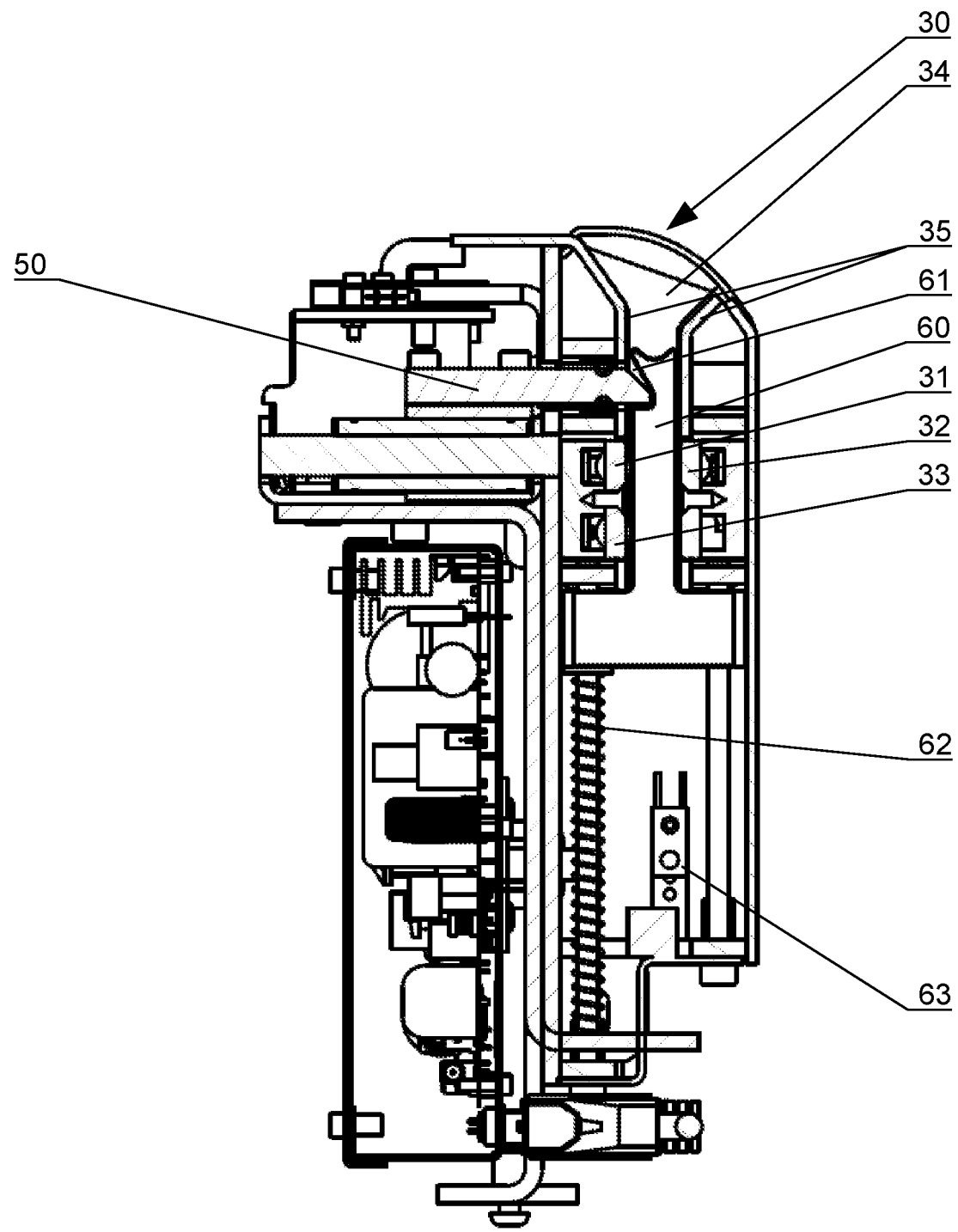
FIG. 5 presents a cross-section C-C from FIG. 4.
Figure 6:
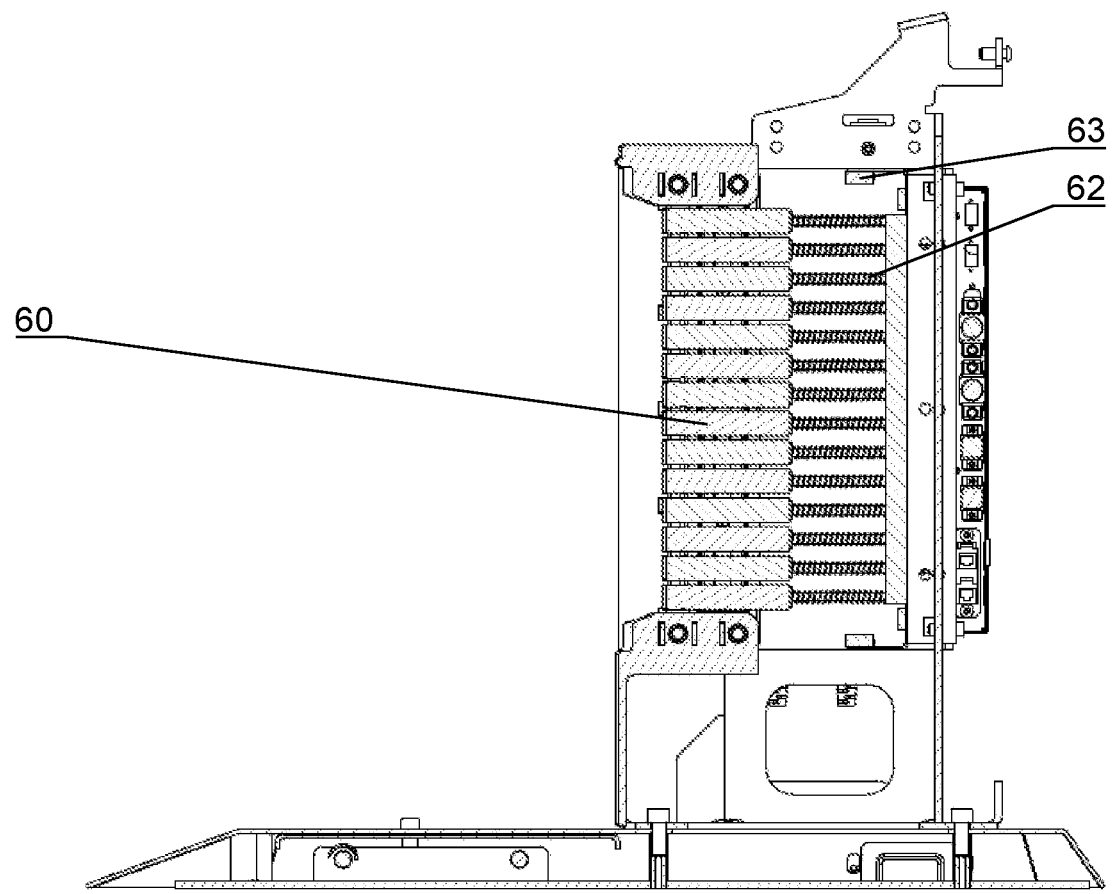
FIG. 6 presents a cross-section B-B from FIG. 4.
Figure 7:
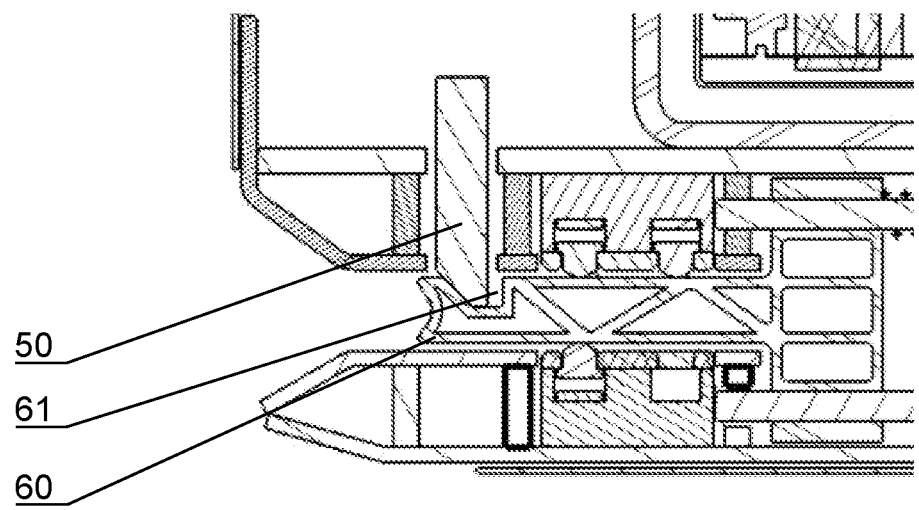
FIG. 7 presents a fragment of a post in a cross-section view.
Figure 8A:
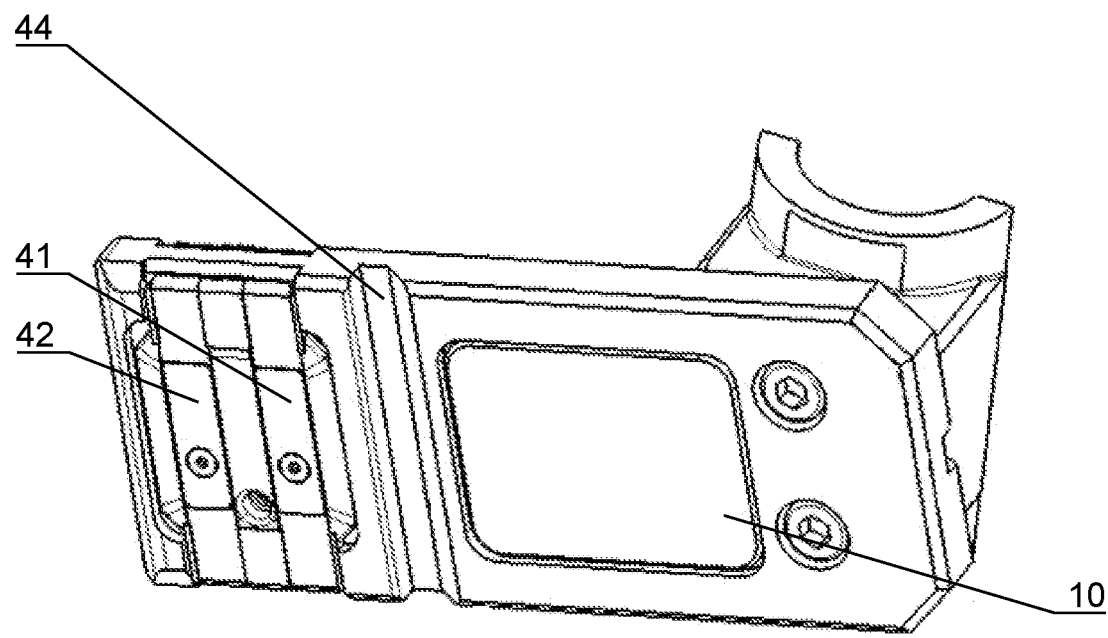
FIG. 8A presents the plug in a front view.
Figure 8B:
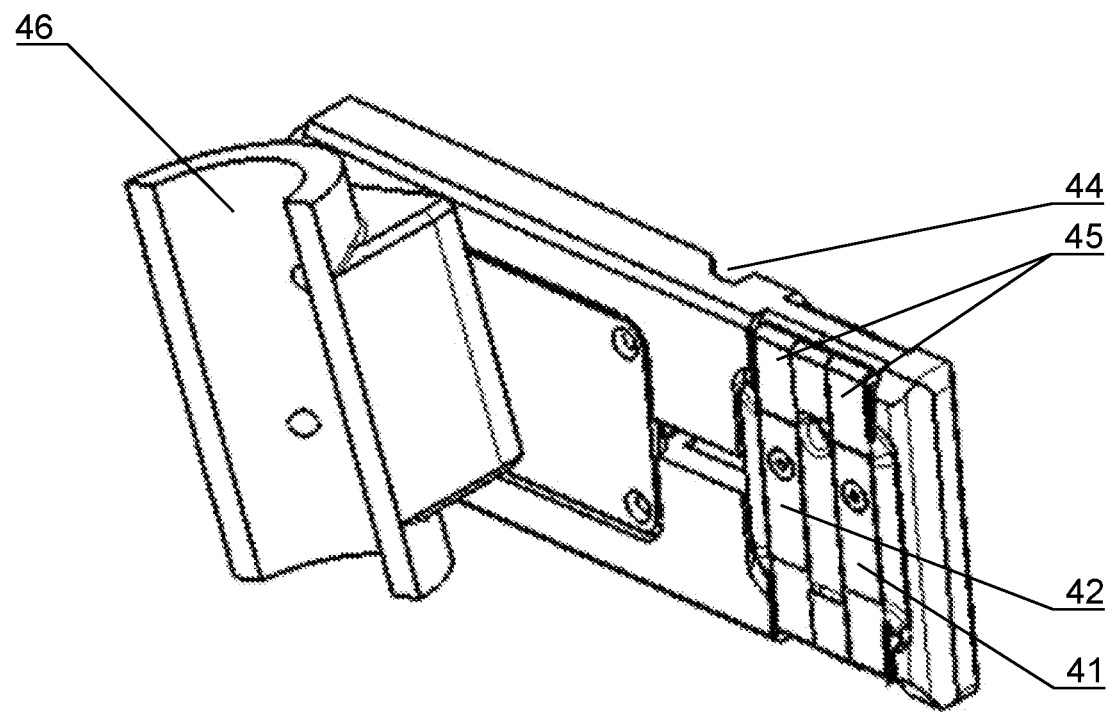
FIG. 8B presents the plug in a back view.
Figure 9:
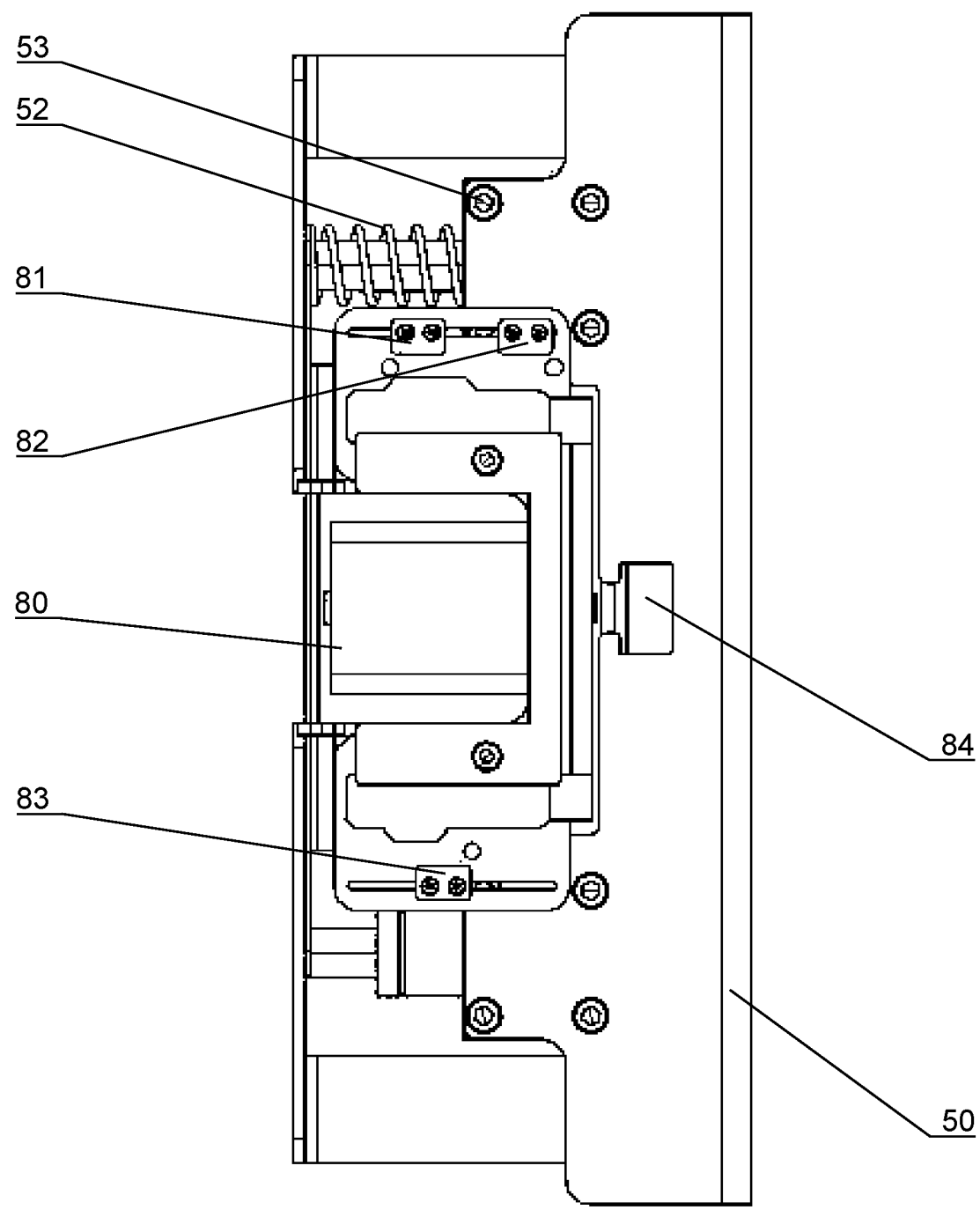
FIG. 9 presents a blocking mechanism in a side view.
Figure 12:
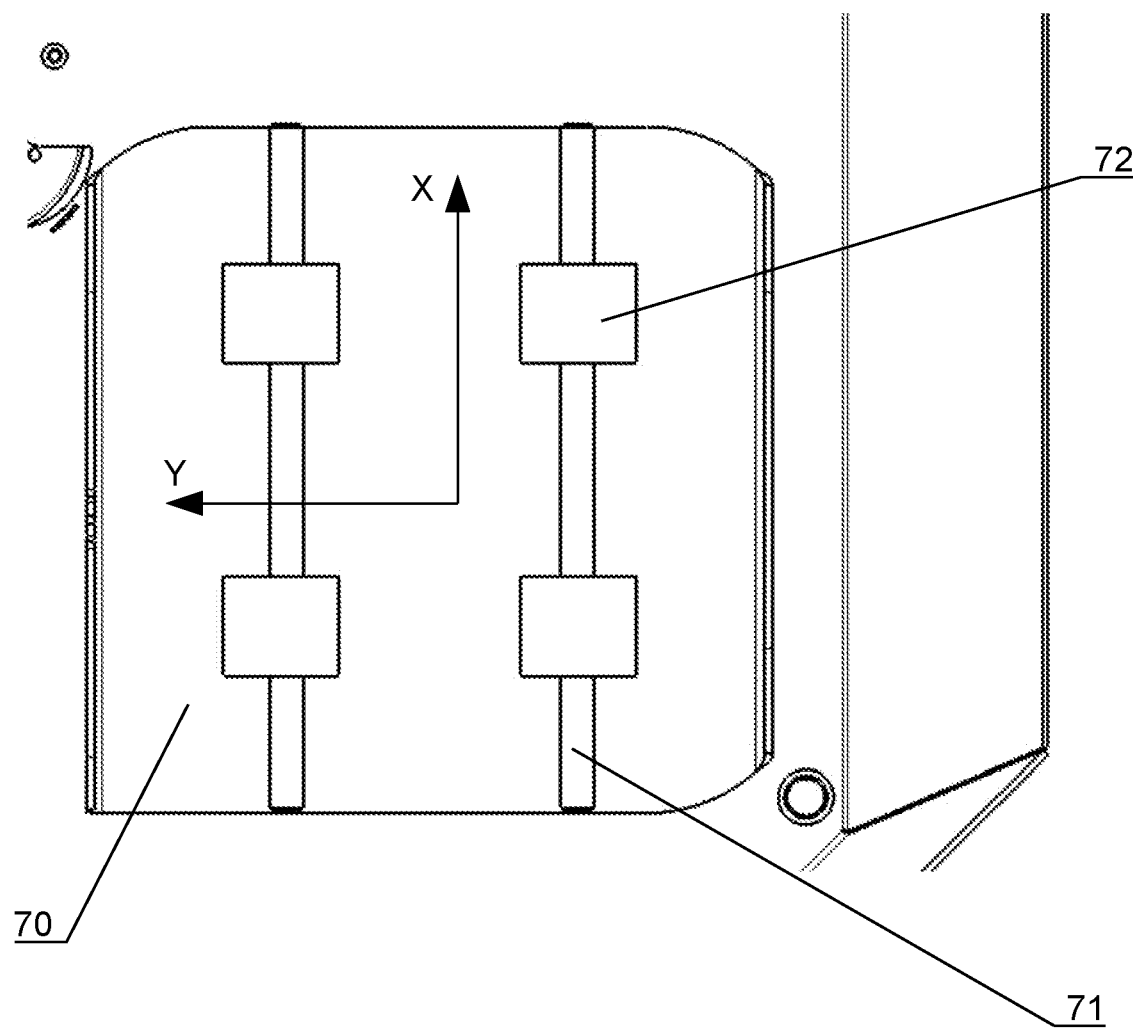
FIG. 12 presents a positioning mechanism in a bottom view.
Figure 13:
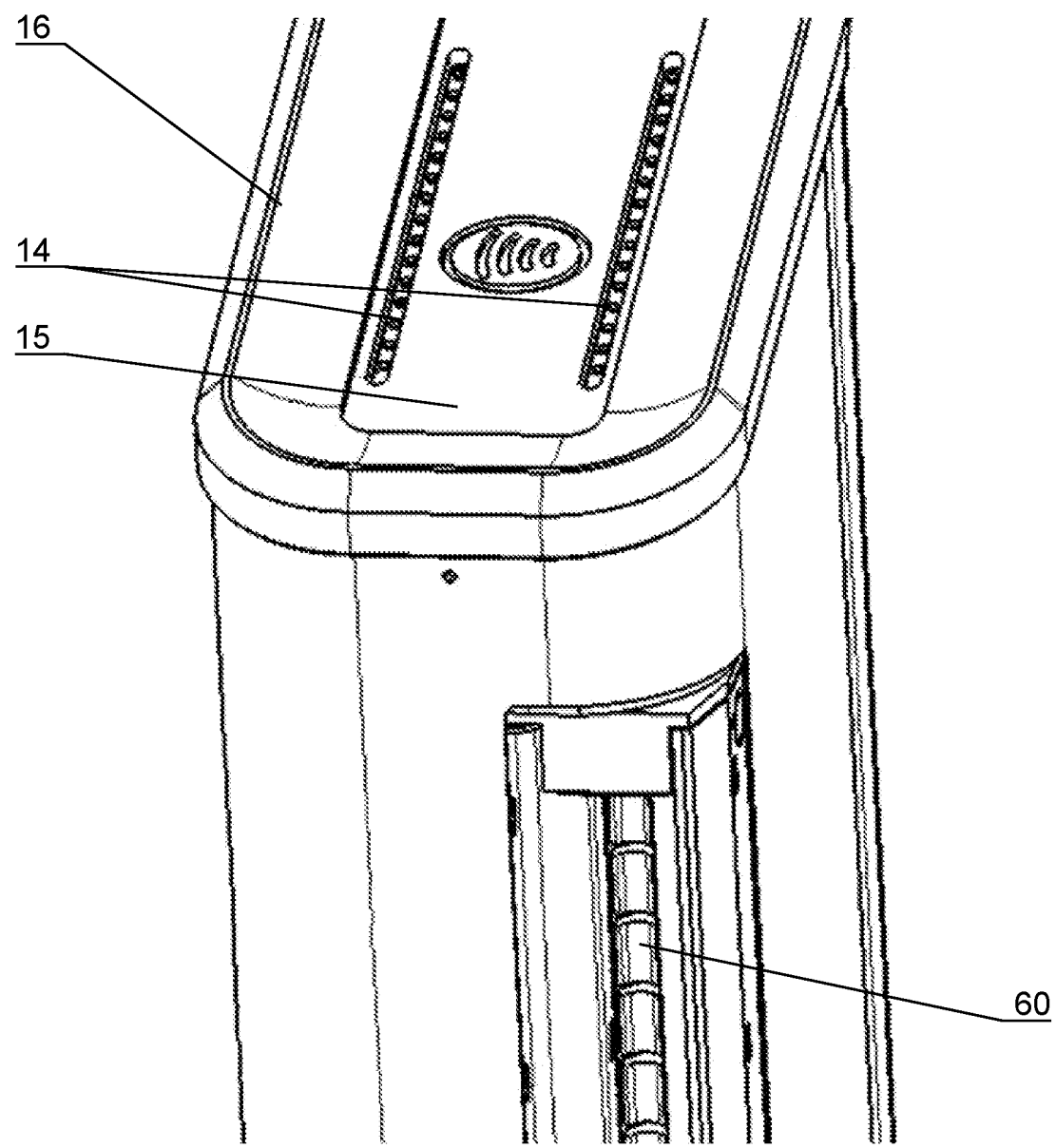
FIG. 13 presents a fragment of the post.

The wheel positioning mechanism 70 have a form of a plate mounted to the base slidably on rails 71 by means of bearings 72 along axis X which is perpendicular to the axis Y (FIGS. 3 and 12). Axis Y is the axis along which the plug 40 is introduced into the socket 30. When the vehicle is to be connected to the post 20, the wheel of the vehicle is standing on the positioning mechanism 70.

In case when the plug 40 is not positioned in line with the socket 30, the users might tend to incline the vehicle in order to insert the plug 40 into the socket 30. However when the plug 40 is inclined with respect to the socket 30 it is hard to properly introduce it into the socket 30. Therefore when the vehicle is inclined and the plug 40 is already at the opening 34 of the socket 30 (the plug 40 is in front of the retractable elements 60 but between the sides 35 of the opening 34), by inclining the vehicle toward the vertical position the plug 40 abuts the sides 35 of the opening and the wheel of the vehicle tends to slide sidewards along the X axis thereby moving the positioning mechanism 70 along the X axis as well. As a result positioning the vehicle towards the vertical position is easier as the wheel is not skidding on the base or ground but is moved to the side together with the slidable wheel positioning mechanism 70.

The charging station operates as follows. In order to start the charging process, the vehicle is wheeled onto the wheel positioning mechanism 70. The user directs the plug 40 into the socket 30 located in the face of the front housing 11.

When bringing the vehicle into the socket 30, the user pushes the retractable elements 60 (which may be also called blocks), thus pushing some of them into the socket 30.

When inserting the plug 40 into the post 20, the locking bar 50, yielding to mechanical force, fits into the plug notch 44 in the plug 40, ensuring that it gets locked. The surfaces of the plug notch 44 in the plug 40 and those of the locking bar 50 are parallel to each other and also perpendicular to the forces that occur when an attempt is being made to pull the vehicle out of the post 20, which, combined, makes it impossible to pull the vehicle out if the locking bar 50 is not mechanically retracted. The locking bar 50 is pressed so that it is impossible to introduce neither any parts of the human body nor any tools into the socket 30 that would physically touch the socket contact means 31, 32, 33.

Meanwhile, the plug contact means 41, 42, 43 on the plug 40 and the socket contact means 31, 32, 33 in the post 20 are in contact with each other. One of the socket contact means 33 is responsible for communication, via the plug contact means 43, with the electric vehicle wheeled onto the post 20, while the other contact means 31, 32, 41, 42 are responsible for charging. Confirmation of the signal between the plug contact means 41, 42, 43 and the socket contact means 31, 32, 33 as well as the signal from the system of sensors lead to activation of the linear stepper motor, which further presses the locking bar 50 making it impossible to pull the vehicle out.

At this point, the charging process begins owing to the socket contact means 31, 32 contacted with the plug contact means 41, 42, 43 on the plug 40.

The invention has a set of two position sensors allowing to control the motor and to inform about the correct position of the locking bar 50. The vehicle gets unlocked by means of a mobile application or a Near Field Communication (NFC) card brought near the post 20. The locking bar 50 is then unlocked by the return movement of the motor shaft, also called blocking mechanism 80 that has a tongue 84 shifting the locking bar 50 into the correct position— unlocked. When that happens, an acoustic signal is produced indicating that the vehicle can now be removed from the post 20.

Technical maintenance of the post 20 can be carried out by turning the lock located on the rear part of the back housing 12, which allows the back housing 12 to be removed and provides access to the PCB. On the underside of the post 20, space has been provided in order to route cables out of the unit through grooves prepared in the base 10. In the upper part of the post 20, in the cover 15, there is a plastic stopper 16 to prevent water from entering the vehicle.

While the invention has been described with respect to an embodiment, it will be appreciated that many variations, modifications and other applications of that embodiment may be made. Therefore, the claimed invention as recited in the claims that follow is not limited to the embodiment described herein.

The invention claimed is:

1. A system for charging electrical micromobility vehicles comprising:
   a plug to be mounted on the electrical micromobility vehicle,
   a post,
   a socket that is located in the post and comprises:
   a longitudinal opening arranged vertically, the longitudinal opening having a height (H) larger than a height (h) of the plug,
   a socket first contact means for providing electrical contact along a first vertical line, a socket second contact means for providing electrical contact along a second vertical line distanced from the first vertical line, and retractable elements for covering the opening of the socket;

a locking bar for securing the plug inside the socket, wherein the plug comprises a plug notch for receiving the locking bar, and wherein the retractable elements comprise a blocking notch for receiving the locking bar, wherein the plug further comprises:

a plug first contact means arranged correspondingly to the socket first contact means, and a plug second contact means arranged correspondingly to the socket second contact means, wherein when the plug is inserted into the socket at any position along the height (A) of the longitudinal opening of the socket, the socket first contact means form an electrical connection with the plug first contact means and the socket second contact means form an electrical connection with the plug second contact means.

2. The system according to claim 1, wherein the ratio of the height (H) of the longitudinal opening of the socket to the height (h) of the plug is equal from 1.5 to 10.

3. The system according to claim 1, wherein the socket comprises a socket third contact means for providing electrical contact along a third vertical line and the plug comprises plug third contact means corresponding to the socket third contact means.

4. The system according to claim 1, further comprising a locking bar for securing the plug inside the socket, wherein the plug comprises a plug notch for receiving the locking bar, and wherein the retractable elements comprise a blocking notch for receiving the locking bar.

5. The system according to claim 1, wherein the plug is to be mounted aside a fork of the electrical micromobility vehicle.

6. The system according to claim 1, wherein the retractable elements have a form of blocks that are slidable in a horizontal direction, wherein during insertion of the plug to the socket, the blocks are pushed by the plug towards the inside of the socket.

7. The system according to claim 6, wherein the post comprises a presence sensor for detecting a position of the retractable elements.

8. The system according to claim 1, wherein the post is mounted on a base.

9. The system according to claim 8, wherein the base comprises a wheel positioning mechanism for positioning a wheel of the electrical micromobility vehicle and the electrical micromobility vehicle while plugging the plug into the socket.

10. A system for charging electrical micromobility vehicles comprising:

a plug to be mounted on the electrical micromobility vehicle, a post, a socket that is located in the post and comprises:

a longitudinal opening arranged vertically, the longitudinal opening having a height (H) larger than a height (h) of the plug, a socket first contact means for providing electrical contact along a first vertical line, and a socket second contact means for providing electrical contact along a second vertical line distanced from the first vertical line, a locking bar for securing the plug inside the socket, wherein the plug comprises a plug notch for receiving the locking bar, and wherein the retractable elements comprise a blocking notch for receiving the locking bar, wherein the plug further comprises:

a plug first contact means arranged correspondingly to the socket first contact means, and a plug second contact means arranged correspondingly to the socket second contact means, wherein when the plug is inserted into the socket at any position along the height (H) of the longitudinal opening of the socket, the socket first contact means form an electrical connection with the plug first contact means and the socket second contact means form an electrical connection with the plug second contact means.

11. A system for charging electrical micromobility vehicles comprising:

a plug to be mounted on the electrical micromobility vehicle, aside a fork of the electrical micromobility vehicle;

a post, a socket that is located in the post and comprises:

a longitudinal opening arranged vertically, the longitudinal opening having a height (H) larger than a height (h) of the plug, a socket first contact means for providing electrical contact along a first vertical line, and a socket second contact means for providing electrical contact along a second vertical line distanced from the first vertical line, wherein the plug further comprises:

a plug first contact means arranged correspondingly to the socket first contact means, and a plug second contact means arranged correspondingly to the socket second contact means, wherein when the plug is inserted into the socket at any position along the height (H) of the longitudinal opening of the socket, the socket first contact means form an electrical connection with the plug first contact means and the socket second contact means form an electrical connection with the plug second contact means.

12. A system for charging electrical micromobility vehicles comprising:

a plug to be mounted on the electrical micromobility vehicle, a post mounted on a base, wherein the base comprises a wheel positioning mechanism for positioning a wheel of the electrical micromobility vehicle and the electrical micromobility vehicle while plugging the plug into the socket;

a socket that is located in the post and comprises:

a longitudinal opening arranged vertically, the longitudinal opening having a height (H) larger than a height (h) of the plug, a socket first contact means for providing electrical contact along a first vertical line, and a socket second contact means for providing electrical contact along a second vertical line distanced from the first vertical line, wherein the plug further comprises:

a plug first contact means arranged correspondingly to the socket first contact means, and a plug second contact means arranged correspondingly to the socket second contact means, wherein when the plug is inserted into the socket at any position along the height (H) of the longitudinal opening of the socket, the socket first contact means form an electrical connection with the plug first contact means and the socket second contact means form an electrical connection with the plug second contact means.

* * * * *